United States Patent [19]

Manthuruthil et al.

[11] Patent Number: 5,560,026

[45] Date of Patent: Sep. 24, 1996

[54] METHOD AND SYSTEM FOR CORRECTIVE RE-INSTALLATION OF AN OBJECT ON A DATA PROCESSING SYSTEM

[75] Inventors: George C. Manthuruthil, Coppell; Shrikant N. Parikh, Mesquite; Hari N. Reddy, Colleyville, all of Tex.

[73] Assignee: International Business Machines Corporation, Armonk, N.Y.

[21] Appl. No.: 104,962

[22] Filed: Aug. 10, 1993

[51] Int. Cl.$^6$ ..................................... G06F 11/30
[52] U.S. Cl. .................. 395/800; 395/155; 395/600; 395/180; 364/285; 364/286.1; 364/DIG. 1
[58] Field of Search .................. 395/800, 425, 395/600, 156, 159; 364/DIG. 1

[56] References Cited

U.S. PATENT DOCUMENTS

| | | | |
|---|---|---|---|
| 4,914,586 | 4/1990 | Swinehart et al. | 364/DIG. 1 |
| 5,134,696 | 7/1992 | Brown et al. | 395/425 |
| 5,159,669 | 10/1992 | Trigg et al. | 395/159 |
| 5,293,466 | 3/1994 | Bringmann | 395/114 |
| 5,297,249 | 3/1994 | Bernstein et al. | 395/156 |
| 5,335,346 | 8/1994 | Fabbio | 395/600 |
| 5,369,778 | 11/1994 | San Soucie et al. | 395/800 |
| 5,396,626 | 3/1995 | Nguyen | 395/700 |

OTHER PUBLICATIONS

Musa, "Operational Profiles in Software–Reliability Engineering", IEEE Software, Mar. 1993, pp. 14–32.

IBM Technical Disclosure Bulletin TDB n9 Feb. 1992 pp. 234–236, *User Interface Design to Hide Complexity in Dialogs.*

IBM Technical Disclosure Bulletin TDB Mar. 1989 p. 255, *User Friendly Interface for Deleting OS/2 Extended Edition 1.0 Communications Manager Features Comprised of Several Files.*

IBM Technical Disclosure Bulletin TDB n11 Apr. 1990 pp. 338–339, *Shipped Code Directory for Software Features.*

IBM Technical Disclosure Bulletin TDB n4 Sep. 1990 p. 84, *Communications Manager Remove Main Menu.*

IBM Technical Disclosure Bulletin TDB n5 Oct. 1990, pp. 76–77, *OS/2 Extended Edition Common Install Driver.*

*Primary Examiner*—Eric Coleman
*Assistant Examiner*—Walter D. Davis
*Attorney, Agent, or Firm*—Geoffrey A. Mantooth

[57] ABSTRACT

An object having several components, such as functions, is located on a data processing system. Every time a user uses any of the components, the use of the component is measured. Information about the use of the components is provided to a user of the system. Selected components and constituents of these components are deleted from the system based on the user's command. Each component may have one or more constituents, which are either used exclusively by the component or are shared by several components. These constituents that are related to the deleted components are either deleted or updated to reflect deletion of the components from the system.

5 Claims, 8 Drawing Sheets

FUNCTION MATRIX TABLE

| FUNCTION ID | FUNCTION NAME | NUMBER OF TIMES INVOKED | DATE & TIME OF LAST INVOCATION | ASSOCIATED PROGRAM FILES |
|---|---|---|---|---|
| 0001 | SPELL CHECKER | 68 | 5/18/1993 09:30 | XYZ.DLL, ABC.DIC, XYZ.INF |
| 0002 | PRINT FUNCTIONS | 29 | 5/18/1993 09:45 | APN.DLL, APN.PRN, APN.PRD |
| 0003 | TRANSFORMS FROM XXX | 0 | — | TRA.DLL, TRA.INF, TRA.DOC |
| 0004 | TRANSFORMS FROM YYY | 3 | 10/2/1991 12:45 | TRA2.DLL, TRA2.INF, TRA2.DOC |
| 0005 | CALENDAR ENABLING | 0 | — | CAL.DLL, CAL2.DLL, CAL.PRF |
| 0006 | MAIL ENABLING | 2 | 10/8/1991 12:10 | MAIL.DLL, MAIL.PRF, MAIL.INF |
| 0007 | IMAGE PROCESSING | 12 | 2/15/1993 10:45 | IMG.DLL, IMG.PRF, IMG.PRN |
| --- | --- | --- | --- | --- |

*Fig. 2*

CROSS FUNCTION REFERENCE TABLE

| FUNCTION INSTALLED | FUNCTION ID | PROGRAM FILES NEEDED TO BE UPDATED | PROGRAM FILES USED BY THESE FUNCTIONS ONLY |
|---|---|---|---|
| YES<br>YES<br>YES<br>NO | 0001<br>0002<br>0003<br>0016 | TEST.PRF,..... | ABC.DLL,..... |
| YES<br>YES | 0002<br>0008 | TEST2.PRF,..... | ABC2.DLL,..... |
| YES<br>NO<br>NO | 0001<br>0015<br>0012 | TEST3.PRF,..... | ABC3.DLL,..... |
| ⋮ | ⋮ | ⋮ | ⋮ |

F ← FUNCTION INSTALLED
G ← FUNCTION ID
H ← PROGRAM FILES NEEDED TO BE UPDATED
I ← PROGRAM FILES USED BY THESE FUNCTIONS ONLY

Fig. 3

METHOD AND SYSTEM FOR CORRECTIVE RE-INSTALLATION OF AN OBJECT ON A DATA PROCESSING SYSTEM

TECHNICAL FIELD OF THE INVENTION

The present invention relates to methods and systems that install and maintain various objects on a data processing system.

BACKGROUND OF THE INVENTION

Generally, software packages contain a set of related functions and features to satisfy a wide variety of customer and installation requirements. For example, a word processing program may contain a spelling checker function, a thesaurus function, an outline function, a format function and so on.

At installation time most of these packages allow the user to pick and choose functions to be installed with the software. Frequently, the user who is new to the software package, and therefore unfamiliar with the usefulness of the functions, may not always be able to make informed decisions as to which functions to install. The user may decide to install many of these functions in the belief that the functions may be used in the future. Also, when confused, the user may decide to add a feature to be on the safe side. Adding these functions and features costs the user in system resources such as disk space and memory. Performance of the system is also negatively affected by the presence of the additional functions and features.

Furthermore, in order to avoid complex installation procedures, the installation of a software package may group together sets of similar functions and allow the user to select sets of functions to be installed. A user requiring only one or two of the functions in a set is forced to install the entire set, thereby using system resources inefficiently.

Over a period of time a user may install a variety of software packages on the system in order to satisfy different needs. The user may be forced to acquire additional hardware for additional disk space and memory on which to place new software packages, while a considerable amount of the existing resources of the system are occupied by unused functions distributed in existing installed software packages. Some of these functions associated with a software package may never be used even after several years.

Prior art data processing systems provide a method and system for deleting functions without having to know the name of every program file of the functions to be deleted. The user only needs to know which function or feature is to be removed in order to remove all program files required to operate the function or feature. Often, however, a typical user is not familiar enough with the operation of the functions and features provided with the software to know which functions and features may be removed without detrimentally affecting the desired operation of the software. Therefore, unused and infrequently used functions remain on the data processing system even though the capability to remove these functions and their related program files exists.

Other prior art methods and systems provide means to streamline and simplify selection by a user of options for operation of the software. Selections dialogs, such as pull down menus, provide listings of options to a user. These complex options may hide several functions in order to reduce confusion of the user. Alternatively, more experienced users may customize the selection dialogs to include more complex options. The functions are not deleted from the data processing system when hidden from the user in the selection dialogs, and still remain a part of the software package. Therefore, the hidden functions continue to occupy needed system resources and negatively affect performance of the system.

SUMMARY OF THE INVENTION

Therefore, it is an object of the present invention to provide a method and system for determining the frequency of use of components of an object located on a data processing system, where the method and system allow the components and their related constituents to be removed from the data processing system. Other constituents that use components selected for deletion are updated to indicate deletion of the selected components.

The method of the present invention allows a user to re-install an object having plural components on a data processing system. Each use of at least one of the components is measured to provide information about use of the component. The information about the use of the component is provided to the user so that the user can determine whether to retain the component on the data processing system. The one component is then deleted from the system.

In one aspect of the invention, the use of the component is measured by determining how many times the component is used. In another aspect of the invention, the use of the component is measured by determining the time of last use of the component by a user.

The data processing system of the present invention has an object with plural components installed thereon and includes means for measuring each use of at least one of the components, where the means for measuring is capable of providing information about use of the component. There is also a means for providing the information to a user so that the user can access the information about use of the component. The user may determine whether to retain the component on the data processing system based upon the information about use of the component.

The present invention allows a user of the data processing system to monitor use of components of an object such as a software package. Information about the use of the components is collected and provided to the user. The user may decide which components are necessary and useful for use of the object on the data processing system, as well as which components are infrequently used. The user may delete the infrequently used components and their constituents from the data processing system if desired. Constituents that used the deleted components but are retained on the data processing system are updated to reflect the deletion of the components.

BRIEF DESCRIPTION OF THE DRAWINGS

FIG. 2 is a table illustrating a Function Matrix Table created by the present invention.

FIG. 3 is a table illustrating a Cross Function Reference Table created by the present invention.

FIG. 4 shows an object installation method which allows installation of an object onto the data processing system along with the corrective re-installation feature of the invention. FIG. 5 shows the execution of the object on the data processing system with the corrective re-installation feature in place. FIGS. 6a, 6b and 6c show the execution of corrective re-installation to re-install the object on the data processing system with only the desired components of the object.

DESCRIPTION OF THE INVENTION

Figure 1:
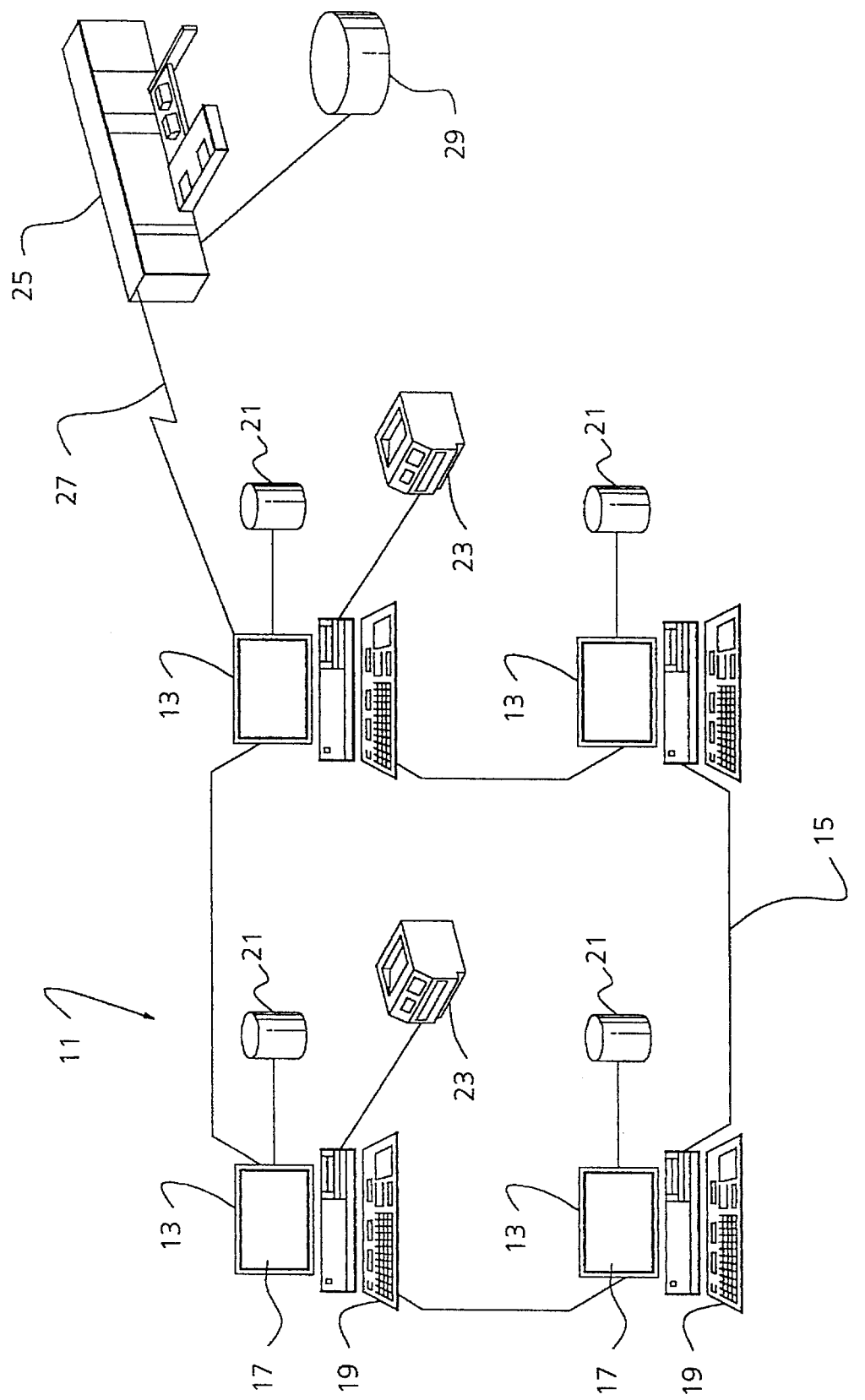
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers or workstations 13 which are connected together in a local area network (LAN) 15. Each workstation 13 includes a user interface, which has a display screen 17 and a keyboard 19. Each workstation 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The host computer 25 may also be coupled to a storage device 29 which may serve as a remote storage for the computers.

The method of the present invention for saving system resources by use of a corrective re-installation feature will now be described with reference to the flow charts and tables of FIGS. 2–6c. In the flow charts the following graphical conventions are observed: a rectangle for either a process, function or screen display, a diamond for a decision and a pentagon and a circle for a connector in exiting to or entering from another part of the flow chart. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Various software packages may be installed on the data processing system 11, wherein they become objects on the data processing system. Generally software packages contain a variety of related functions and features to satisfy user and installation requirements. At the time of installation of a software package onto the data processing system 11, most packages allow the user to pick and choose which functions or sets of functions to install. Frequently, the user installs all of the functions since the user is unfamiliar with the software and is unsure which functions are important to the user. Some of the functions will be used only infrequently, if at all, by the user. These infrequently used functions cost the user in system 11 resources in the form of disk space and memory as well as performance.

The present invention enables a user to "re-install" a software package at some time after the initial installation in order to delete little used functions and features from the data processing system 11. A Function Matrix Table, FIG. 2, and a Cross Function Reference Table, FIG. 3, are created at the time of initial installation of the software package. The Function Matrix Table monitors the frequency of use of the functions in the software object, as well as the date and time of use of each function. The Cross Function Reference Table cross indexes functions and files used by the functions. After a period of use the user can review the Function Matrix Table to determine which functions are not in use. The user can then select for deletion those functions which have not been used. The software package may then be re-installed on the data processing system without these functions. Program files solely associated with deleted functions are also deleted.

Figure 4:
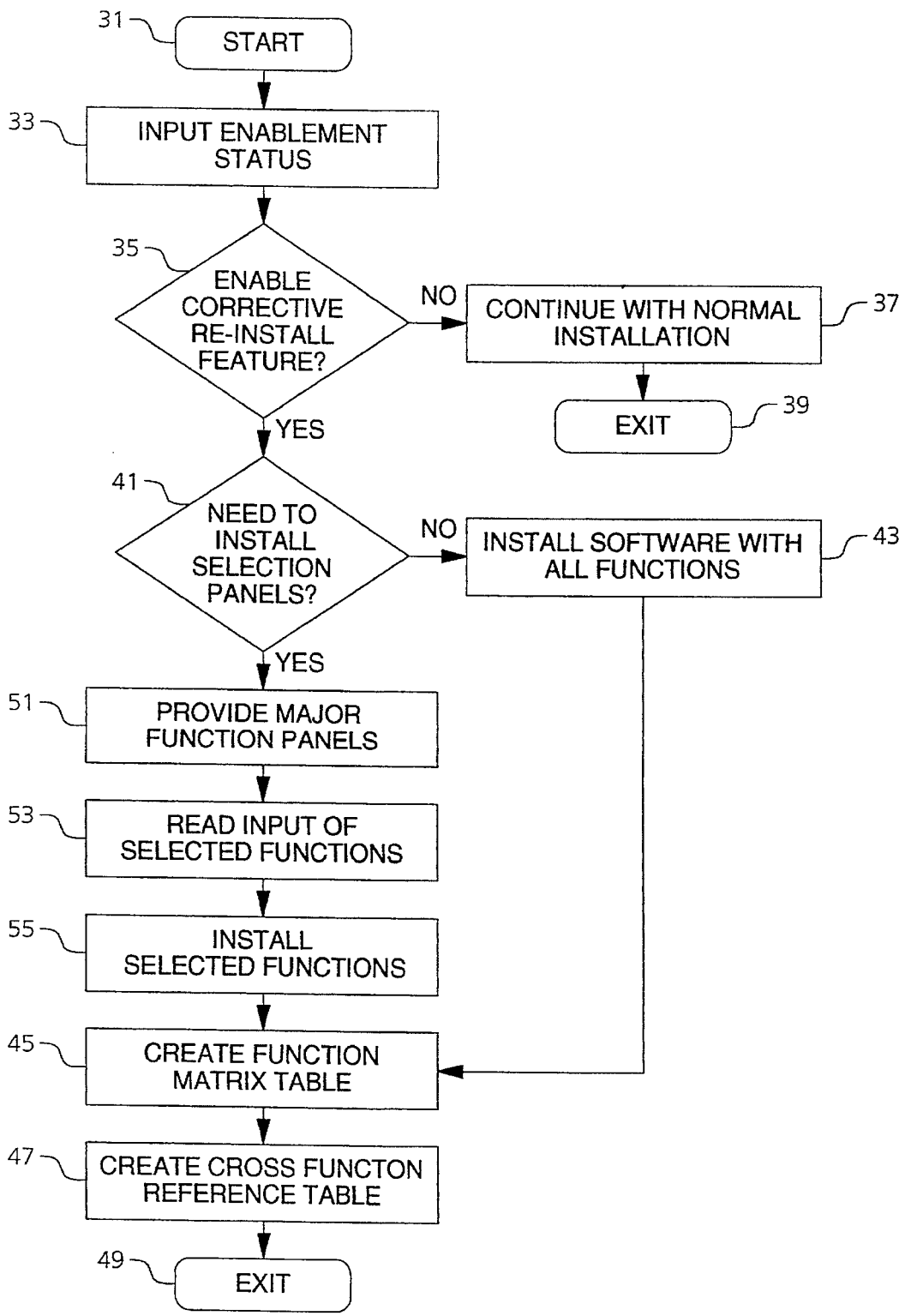
FIGS. 4, 5, 6a, 6b and 6c are flow charts showing the method of the present invention, in accordance with a preferred embodiment.
Figure 5:
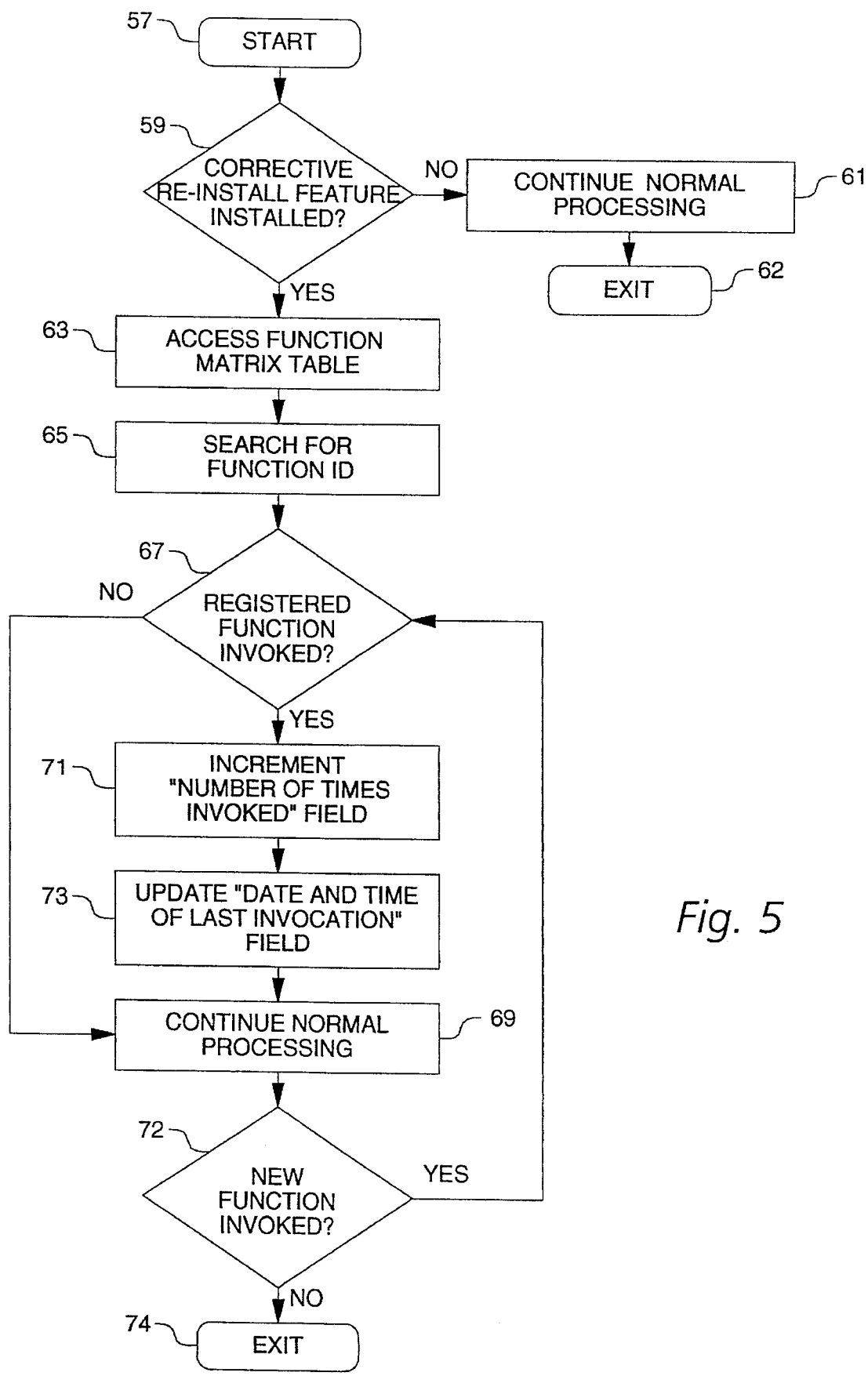

A software product is installed in the data processing system 11 according to the method shown in FIG. 4. The method of FIG. 4 is a program that typically exists as a part of the software package, although the program may exist separately from the software package in the data processing system 11. Upon initiation of installation of the software product the method is executed, step 31. In step 33, an input from the user indicating an enablement status is received. The enablement status is an input that indicates whether the user desires the re-install feature to be enabled. Typically, a prompt is used to ask the user whether the re-install feature should be activated. The method determines if the corrective re-install feature is to be enabled based on the user's input, step 35. If NO, then the installation of the software into the data processing system 11 continues normally, step 37. Then the method exits the installation process after the software is installed on the data processing system 11, step 39.

If the result of step 35 is YES, the corrective re-install feature is to be enabled, the method proceeds to step 41 where it is determined whether selection panels or windows need to be provided on the display 17. Selection panels are typically provided when the functions associated with the software are numerous and/or complex in order to assist the user. The selection panels enable the user to select functions the user thinks may be important for use with the software. Non-selected functions are not installed with the software onto the data processing system 11, thereby saving system 11 resources.

If the software uses relatively few functions, then the result of step 41 is NO, selection panels do not need to be provided. The method then proceeds to step 43 where the software is installed with all of its associated functions. After installation of all of the software is complete, a Function Matrix Table is created, step 45, and then a Cross Function Reference Table is created, step 47. The method then exits the installation process, step 49.

However, if the software uses numerous and/or complex functions, then the result of step 41 is YES, selection panels need to be provided. The method proceeds to step 51 where selection panels of the major functions are provided to the user on the display. The user may choose the desired functions to be installed from the selection panels. The method reads the input from the selection panels, step 53, to determine which functions the user desires to have installed. The selected functions are then installed with the software, step 55. After installing the software and selected functions, the method then creates a Function Matrix Table, step 45, and subsequently creates a Cross Function Reference Table, step 47. The method then exits the installation process, step 49.

Referring now to FIG. 2, an example of the Function Matrix Table created in step 45 is shown. The Function Matrix Table correlates each function installed with use and file data related to that function. Information regarding the frequency and times of use of a function, as well as the files that are used exclusively by that function, is maintained in the Function Matrix Table. Function names are stored in a "Function Name" field, column B. The function names are taken from each function installed as part of the software. Some examples of function names that might be stored in the "Function Name" field are shown in FIG. 2, column B and include "Spell Checker", "Print Functions" and "Transforms from XXX".

Each function name is assigned a function identification. The function identification is stored in a "Function ID" field, column A. The function identification number is provided as a handle for ease of manipulation of information regarding its corresponding function. The speed of processes accessing the Function Matrix Table is enhanced through the ease of manipulation provided by the function identification numbers. Some representative function identification numbers are shown in FIG. 2, column A and include "0001", "0002" and "0003".

The number of times that each specific function is used while the re-installment feature is enabled is recorded in the "Number of Times Invoked" field, column C. Initially, upon enablement of the re-installment feature, all entries in the "Number of Times Invoked" field are set to zero. Every time a specific function is used thereafter, the "Number of Times Invoked" field entry is incremented by one for that particular function. For example, in FIG. 2, the "Spell Checker" function has been invoked 68 times, the "Print Functions" function has been invoked 29 times, and the "Transforms From XXX" function has been invoked 0 times. The information stored in the "Number of Times Invoked" field is useful in helping a user decide which functions are infrequently used and may be deleted from the data processing system 11 while retaining frequently used functions.

The most recent time that a particular function was invoked is recorded in the "Date and Time of Last Invocation" field, column D. Each time a function is invoked the current time and date at the time of invocation is retrieved from the system 11 and stored in the "Date and Time of Last Invocation" field for that particular function. Previous information stored in the field for that function is removed upon storage of a new date and time, so that only the most recent date and time of invocation of that function is retained in the field. For example, in FIG. 2 the "Spell Checker" function was last invoked at 09:30 on May 18, 1993, the "Print Functions" function was last invoked at 09:45 on May 18, 1993 and the "Transforms From YYY" function was last invoked at 12:45 on Oct. 2, 1991.

Each function is implemented by executing one or more files. Each function typically has a main file that must be executed in order to implement the function. For example, for a spell checker function, the main file may be SPELL.EXE. The number of times invoked and the date and time of last invocation of a function is monitored by monitoring the execution of such a main file. Of course, when monitoring the date and time of invocation, a clock in the computer 13 or system 11 is used.

Some of the files used by a particular function are used exclusively by that function. Therefore, deletion of the function results in a deletion of those files. Such files include the main function files discussed above (such as SPELL.EXE), executable files (.EXE. and .COM files), associated help and message files and end user interface files. These files are listed in column E of the Function Matrix Table (for example XYZ.DLL, ABC.DIC and XYZ.INF).

Other files are shared by two or more functions. These type of files are listed in column I of the Cross Function Reference Table of FIG. 3 (for example, ABC.DLL). Such files may be shared data files, linking files, etc. When all of the functions utilizing these files have been deleted, then these shared files may be deleted from the system 11 as well.

Still other files refer to functions. Such files may be menu files that list a function as a choice. When the function is deleted, then the referring file can be updated to eliminate the reference to the deleted function. These files are listed in column H of FIG. 3 (for example, TEST.PRF).

Referring back to FIG. 2, program files that are exclusively associated with a particular function are recorded in the "Associated Program File" field, column E. These files are identified from call steps located in files that are known to be associated with a function (such as a main file). For example, in FIG. 2 the program files XYZ.DLL, ABC.DIC and XYZ.INF are exclusively related to the "Spell Checker" function. When a function is deleted from the data processing system 11, all the program files in the "Associated Program Files" field for that function may be deleted as well since the associated program files are only used in conjunction with the deleted function.

Referring now to FIG. 3, an example of the Cross Function Reference Table created in step 47 is shown. The Cross Function Reference Table serves to cross-index program files used by more than one function so that such files may be updated, retained, or deleted upon deletion of a particular function from the data processing system.

The function identification numbers of sets of functions exclusively sharing a particular set of program files are stored in a "Function ID" field, column G. The program files used exclusively by the functions identified in the "Function ID" field are registered in a "Program Files Used By These Functions Only" field, column I. The functions represented by the function identification numbers in the "Function ID" field are grouped in the "Function ID" field so that every function of a particular 'calling' group of functions calls every program file in the "Program Files Used By These Functions Only" field corresponding to that particular calling group of functions. The program files are grouped in the "Program Files Used By These Functions Only" field so that each program file in the field is only called by the functions of a corresponding calling group of functions. For example, in FIG. 3 the functions identified by the function identification numbers 0001, 0002, 0003, 0016 from a calling group in which every function calls the program file ABC.DLL, which is not called by any other function installed on the system. The grouping of functions and program files exclusively associated with those functions in the Cross Function Reference Table allows program files that are called by more than one function to be identified for deletion if every function that calls those program files has been deleted.

The status of the functions represented in the "Function ID" field is stored in the "Function Installed" field, column F. As shown in FIG. 3, the status of the functions may be "YES" if the function is installed on the system 11, or "NO" if the function has been deleted from the system. If every entry in the "Function Installed" field is "NO" for a particular group of functions represented by the function identification numbers in the "Function ID" field, then the corresponding program files in the "Program Files Used By These Functions Only" field may be deleted since every function that calls these program files has been deleted.

The identity of program files that need to be updated upon deletion or installation of one or more functions identified in the "Function ID" field is filed in the "Program Files That Need To Be Updated" field, column H. Program files that need to be updated are related to the functions identified in the "Function ID" field, but not exclusively. Therefore, these program files must be updated to indicate the status of a function, however, the program files need not be deleted themselves if the function is deleted. For example, a program file in the "Program Files That Need To Be Updated" field may call a particular function to accomplish a specific task. If that function is deleted the program file must be updated to show that the task can no longer be accomplished. Each program file in the "Program Files That Need To Be Updated" field must be related to every function identified in the "Function ID" field. These files, along with the program files used by these functions only, are identified from call steps.

Referring back to the flow charts, the method of FIGS. 5 and 6a–6c will now be discussed. After the installation of the object onto the system 11, the object is executed by the execution method shown in FIG. 5. Upon initiation of use of the object installed on the data system 11, the method is executed, step 57. The method determines if the corrective re-install feature is enabled, step 59. If NO, then normal processing of the object is continued, step 61. After termination of normal processing the method ends, step 62.

If the result of step 59 is YES, so that the corrective re-install feature is enabled, then the Function Matrix Table is accessed, step 63. The method then searches the "Function ID" field, column A of FIG. 2, to compare a function invoked for execution by the object with functions registered in the Function Matrix Table, step 65. The method then determines whether a registered function is invoked by finding whether the invoked function matches any function registered in the "Function ID" field of the Function Matrix Table, step 67. If NO, then the invoked function does not match any registered function, and normal processing of the software is continued, step 69.

If the result of step 67 is YES, a registered function matches the invoked function, then the "Number of Times Invoked" field, column C of FIG. 2, for the matched registered function is incremented by one, step 71. The method then updates the "Date and Time of Last Invocation" field, column D of FIG. 2, of the matched registered function to the time and date of invocation of the function, step 73. The time and date are retrieved from the system 11 for placement in the "Date and Time of Invocation" field. After updating the date and time the function was invoked, normal processing of the object is continued, step 69.

During normal processing of the object, step 69, a new function may be invoked. In step 72, the method determines if a new function has been invoked. If NO, then the method stops, step 74. However, if the result of step 72 is YES, then the method returns to step 67. If the result of step 67 is YES, a registered function is invoked, the method proceeds through steps 71 and 73 to increment the number of times the function has been invoked and to update the time and date of last invocation of the function, and then returns to continue normal processing, step 69.

Figure 6A:
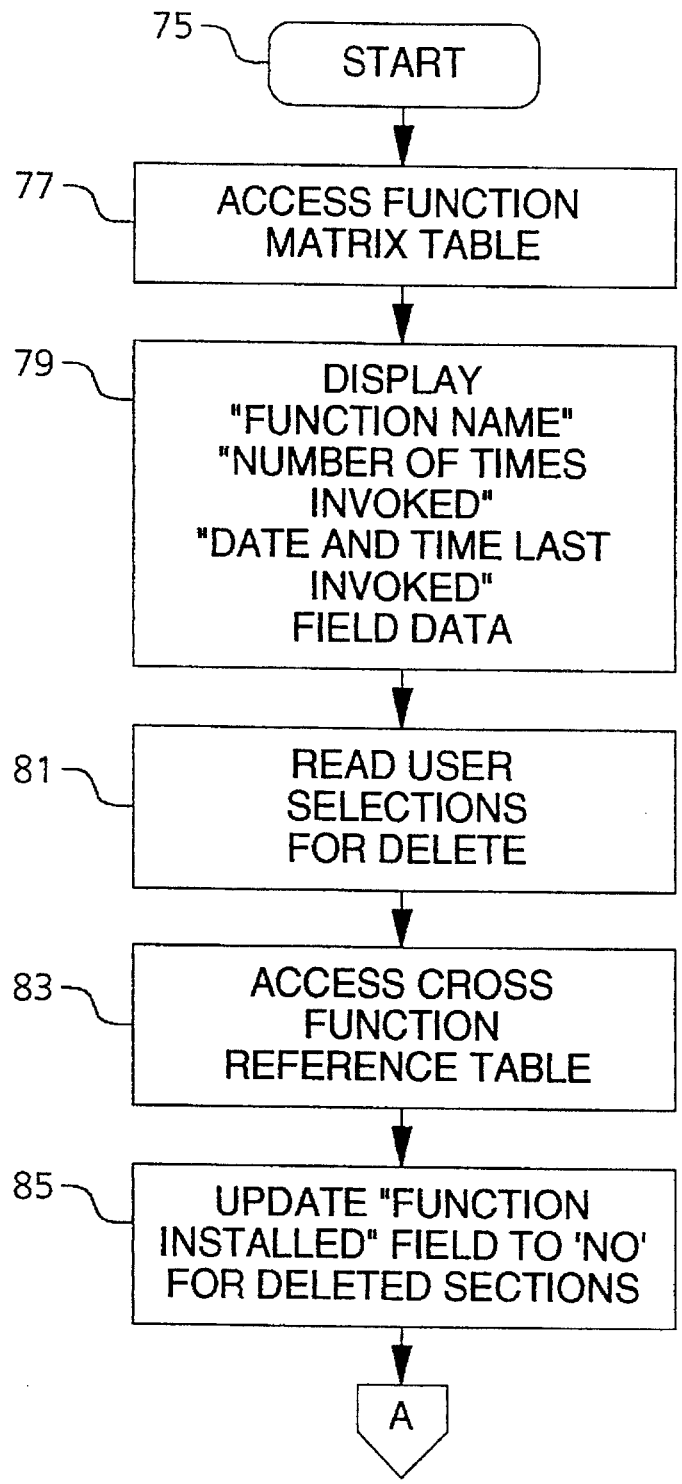
Figure 6B:
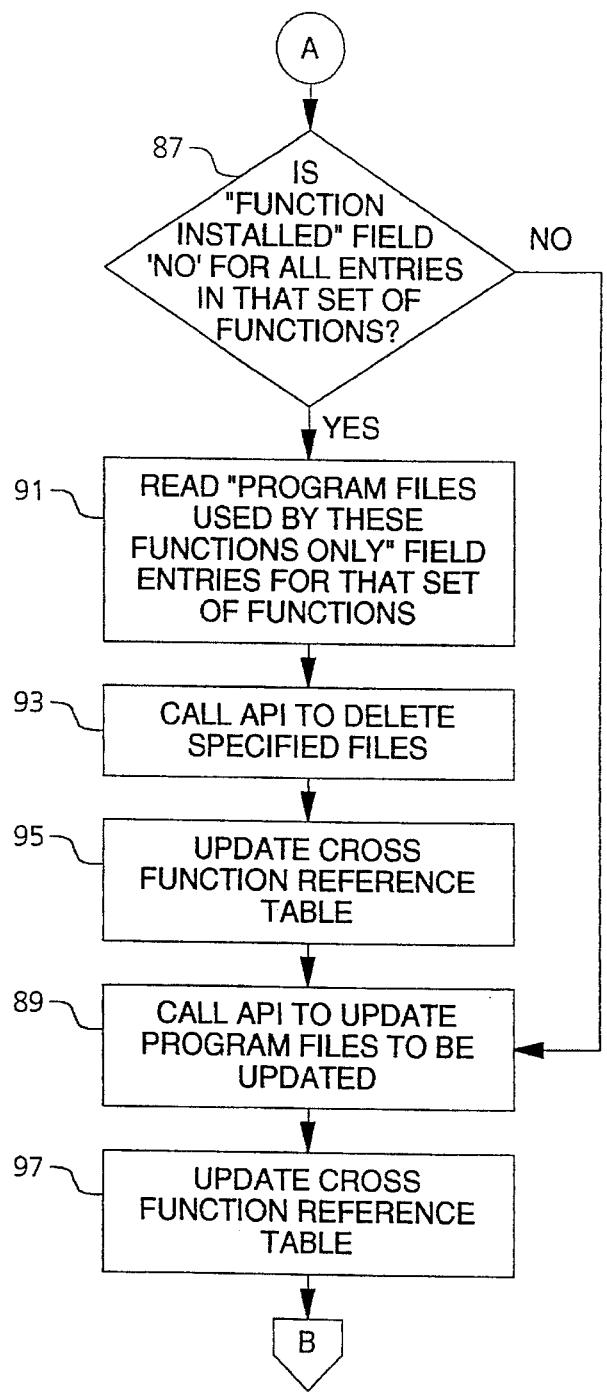
Figure 6C:
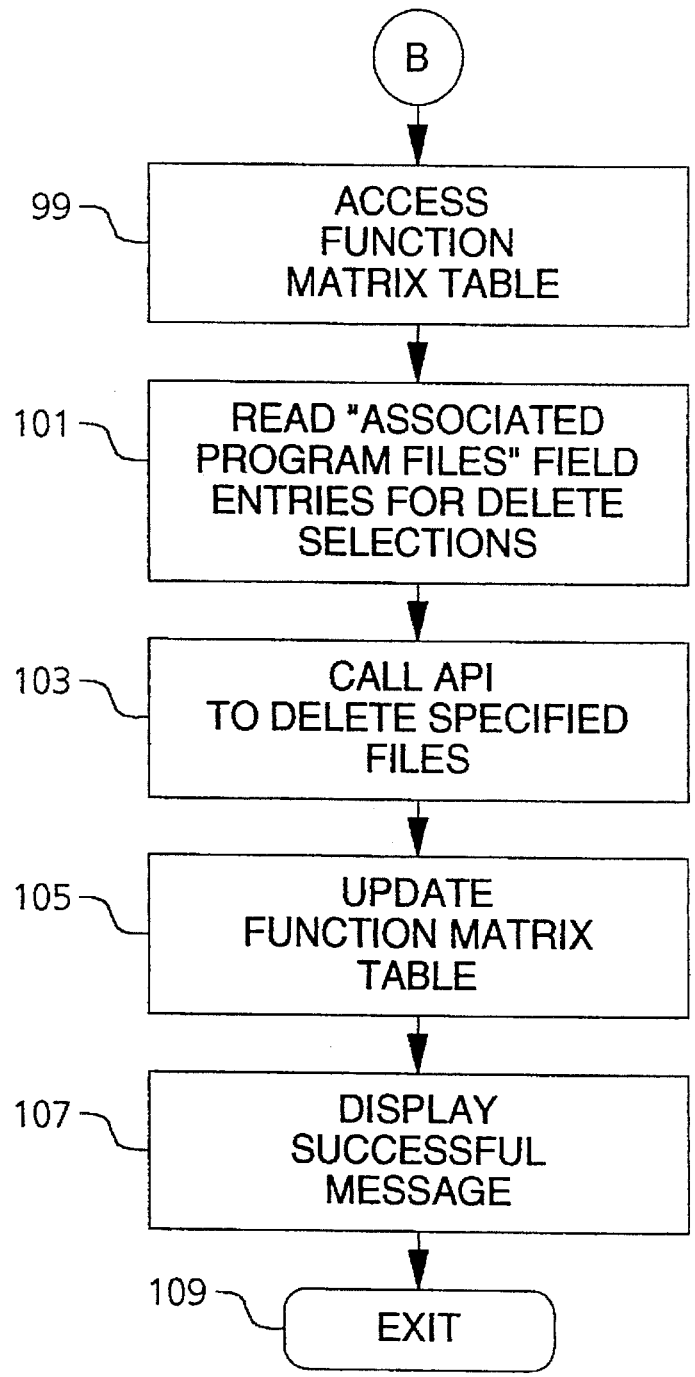

After the software has been in use for a period of time, a user may desire to re-install the software to eliminate infrequently used functions or features. The method of FIGS. 6a–6c is executed upon initiation of enabling corrective re-installation, step 75. In FIG. 6a, the method accesses the Function Matrix Table, step 77, and then displays on the screen 17 data from the "Function Name", "Number of Times Invoked", and "Date and Time of Last Invocation", fields, columns B, C and D of FIG. 2, step 79. For example, the first display entry for the table shown in FIG. 2 would have a function name of "Spell Checker" that would have a Number of Times Invoked equalling 68, and that had a last date and time of invocation at 09:30 on May 18, 1993.

The user may view the information displayed to determine whether particular functions are frequently or infrequently used during operation of the software, as well as whether the particular functions have been used recently. The user may then select functions for deletion. Typically, the user will want to delete infrequently used functions, such as "Transforms From XXX" in the example Function Matrix Table of FIG. 2, or functions that have not been used recently, such as "Transforms From YYY" shown in FIG. 2.

The method reads the user selections to determine which functions are to be deleted, step 81. The Cross Function Reference Table is then accessed, step 83, and the "Function Installed" field, column F, is updated to indicate "NO" for the selected functions, step 85. The "NO" indication shows that the function selections are to be deleted, or have been deleted, from the data processing system 11.

As shown in FIG. 6b, after indicating the functions which are to be deleted, the method then determines whether the "Function Installed" field indicates that all entries in a set of functions have "NO" entries, step 87. If all the entries of a set of functions in the "Function Installed" field are "NO" then all program files exclusively relating to that set of functions are deleted from the system 11 and all program files related to that set of functions are updated to reflect the selected deletions. If some of the entries of a set of functions in the "Function Installed" field are "YES" then the exclusively related program files are to be retained on the system and all that is required is the updating of related program files.

Therefore, if the result of step 87 is NO, the "Function Installed" field is not "NO" for all entries in a reviewed set of functions, and all that must be done is to update all program files related to the functions selected to be deleted to reflect deletion of those functions from the system 11. The method calls an application programming interface ("API") to update files relating to the deleted functions, step 89. The API is part of the operating system and is conventional. The files that are to be updated are located in the "Program Files That Need To Be Updated" field, column H, corresponding to the set of functions. For example, in FIG. 3, the program file TEST.PRF would need to be updated if the status of any of the functions 0001, 0002, 0003, 0016 changed on the data processing system 11. After the program files are updated by the API in step 89, the Cross Function Reference Table is updated to indicate that the program files have been updated, step 97. Such indication may be by using selected emphasis to display the updated file names.

If the result of step 87 is YES, the "Function Installed" field contains "NO" entries for all the entries in a reviewed set of functions, all program files exclusively related to the set of functions are deleted from the system 11. The "Program Files Used By These Functions Only" field, column I, are read to determine the program files corresponding exclusively to the set of deleted functions, step 91. For example, in FIG. 3, if the "Function Installed" field indicated "NO" entries for functions 0001, 0002, 0003 and 0016, then the method would determine that the program file ABC.DCL corresponds exclusively with functions 0001, 0002, 0003 and 0016. In step 93, the method then calls the API to delete those program files determined in step 91, as these program files are no longer necessary to support any installed functions. The Cross Function Reference Table is updated to indicate which program files were deleted, step 95.

Then, as described above, the API is called to update program files relating to the deleted functions, step 89, the program files to be updated being located in the "Program Files That Need To Be Updated" field corresponding to the deleted set of functions. After the program files are updated by the API in step 89, the Cross Function Reference Table is updated to indicate that the program files have been updated, step 97.

Then, as shown in FIG. 6c, after updating the Cross Function Reference Table in step 97, the method accesses the Function Matrix Table, step 99, in order to delete all program files exclusively associated with each particular function selected to be deleted. The "Associated Program Files" field, column E in FIG. 2, is read for the functions selected to be deleted, step 101. The program files located in the "Associated Program Files" field are associated exclusively with a corresponding function, therefore, they may be deleted if the corresponding function is deleted. For example, in FIG. 2, the program files TRB.DLL, TRA.INF and TRA.DOC are exclusively associated with the function TRANSFORMS FROM XXX, and may be deleted from the system 11 upon deletion of TRANSFORMS FROM XXX.

In step 103, the method calls the API to delete the associated program files. The Function Matrix Table is then updated to reflect the deletion of the associated program files, step 105. The method then displays a successful re-installment message, step 107, indicating that all program files exclusively associated with the functions selected for deletion have been successfully deleted, that all program files exclusively associated with the functions selected for deletion and other already deleted functions have been successfully deleted, and that all program files related to the functions selected for deletion have been updated. The method then ends, step 109.

The foregoing disclosure and the showings made in the drawings are merely illustrative of the principles of this invention and are not to be interpreted in a limiting sense.

What we claim is:

1. A method of allowing a user to re-install an object on a data processing system, said object having plural components, comprising the steps of:
   a) measuring each use of at least one of said components by a user to provide information about use of said measured component on said data processing system;
   b) providing said information to said user so that said user can determine whether to retain said measured component on said data processing system;
   c) deleting said measured component from said data processing system;
   d) determining if there are constituents exclusively related to said measured component and an other one of said components;
   e) determining if said other component has been deleted from said data processing system; and
   f) said step of deleting said measured component further comprising the step of deleting said constituents of said measured component and said other component if said other component has been deleted from said data processing system upon a command from said user to delete said measured component from said system.

2. A method of allowing a user to re-install an object on a data processing system said object having plural components comprising the steps of:
   a) measuring each use of at least one of said components by a user to provide information about use of said measured component on said data processing system;
   b) providing said information to said user so that said user can determine whether to retain said measured component on said data processing system;
   c) deleting said measured component from said data processing system;
   d) the step of measuring each use of at least one of said components by a user further comprises the steps of;
      i) determining how many times said measured component is used;
      ii) determining a time of last use of said measured component by said user;
   e) before measuring each use of said measured component, providing said user a selection of components to be used with said object and installing selected components on said data processing system;
   f) determining if there are first constituents exclusively related to said measured component;
   g) determining if there are second constituents related exclusively to said measured component and an other one of said components;
   h) determining if said other component has been deleted from said data processing system;
   i) deleting said measured component, said first constituents of said measured component, and said second constituents of said measured component and said other component, if said other component has been deleted from said data processing system upon a command from said user to delete said measured component from said system; and
   j) updating third constituents related to said measured component upon said command to delete said measured component from said data processing system.

3. A data processing system having an object with plural components installed thereon, comprising:
   a) means for measuring each use of at least one of said components by a user, said means for measuring being capable of providing information about use of said measured component on said data processing system;
   b) means for providing said information to said user so that said user can determine whether to retain said measure component on said data processing system;
   c) means for deleting said measured component from said data processing system;
   d) means for determining if there are second constituents exclusively related to said measured component and a second component;
   e) means for determining if said second component has been deleted from said data processing system; and
   f) said means for deleting said measured component further comprising means for deleting said second constituents of said measured component, if said second component has been deleted, from said data processing system upon a command from said user to delete said measured component from said system.

4. A data processing system having an object with plural components installed thereon, comprising:
   a) means for measuring each use of at least one of said components by a user, said means for measuring being capable of providing information about use of said measured component on said data processing system;
   b) means for providing said information to said user so that said user can determine whether to retain said measured component on said data processing system;
   c) means for deleting said measured component from said data processing system;
   d) said means for measuring further comprises:
      i) means for determining how many times said measured component is used;
      ii) means for determining a time of last use of said measured component by said user;

e) means for determining if there are first constituents exclusively related to said measured component;

f) means for determining if there are second constituents related exclusively to said measured component and a second component;

g) means for determining if said second component has been deleted from said data processing system;

h) means for deleting said measured component and said first constituents from said data processing system upon a command from said user to delete said measured component from said system;

i) means for deleting said second constituents of said measured component, if said second component has been deleted from said system, upon said command from said user to delete said measured component from said system;

j) means for updating third constituents related to said measured component upon said command from said user to delete said measured component from said system.

5. The system of claim 4, further comprising:

a) means for providing said user a selection of components to be used with said object before measuring use of said components with said means for measuring;

b) means for installing components selected by said user on said data processing system.

* * * * *